United States Patent
Yoshida et al.

(10) Patent No.: US 6,662,214 B1
(45) Date of Patent: Dec. 9, 2003

(54) CLASS-CREATION FROM DISK

(75) Inventors: Yukihiro Yoshida, Tokyo (JP); Dimitri Willy Carine Torfs, Ghent (BE)

(73) Assignee: Sony Service Center (Europe) N.V., Londerzeel (BE)

( * ) Notice: Subject to any disclaimer, the term of this patent is extended or adjusted under 35 U.S.C. 154(b) by 0 days.

(21) Appl. No.: 09/491,827

(22) Filed: Jan. 26, 2000

(30) Foreign Application Priority Data

Jan. 28, 1999 (EP) .............................................. 99200255

(51) Int. Cl.[7] .............................................. G06F 15/167
(52) U.S. Cl. ........................................ 709/216; 709/213
(58) Field of Search ................................ 709/213, 216, 709/217, 315, 316; 707/103, 104; 717/115, 116, 148, 118; 711/147, 202

(56) References Cited

U.S. PATENT DOCUMENTS

| | | | |
|---|---|---|---|
| 5,717,854 A | | 2/1998 | Egawa et al. |
| 5,732,257 A | * | 3/1998 | Atkinson et al. ............... 707/4 |
| 5,752,249 A | * | 5/1998 | Macon et al. ........... 707/103 R |
| 5,943,496 A | * | 8/1999 | Li et al. ...................... 709/328 |
| 6,260,076 B1 | * | 7/2001 | Savitzky et al. ............ 709/315 |
| 6,266,716 B1 | * | 7/2001 | Wilson et al. ................ 710/33 |

FOREIGN PATENT DOCUMENTS

EP          0 653 885          5/1995

* cited by examiner

*Primary Examiner*—Mehmet B. Geckil
(74) *Attorney, Agent, or Firm*—Frommer Lawrence & Haug LLP; William S. Frommer; Bruno Polito

(57) ABSTRACT

The present invention describes a network system, comprising at least two network units, of which at least the first network unit is provided with an insufficient amount of memory space, wherein the first network unit, which comprises said insufficient amount of memory space, is able to create a program object through the network to a second network unit which comprises a sufficient amount of memory space.

6 Claims, 1 Drawing Sheet

CLASS-CREATION FROM DISK

BACKGROUND OF THE INVENTION

In interactive video systems a viewer or end user chooses a movie which is to be displayed on the monitor of the end user. In video-on-demand systems a direct connection from a network unit to the monitor of the end user is established, whereafter the demanded movie can be viewed by the end user.

In those known systems the end user is provided with a network platform or set top box, which is connected to the monitor and to the remote network unit, wherein the connection is established for example by a public network. To perform all preferred functions the set top box needs a large amount of memory, which in many cases is not available. Also a set top box generally does not have a disk to store data on. More specifically, a set top box usually comprises an insufficient amount of memory to keep in memory all information needed for the instantiation of program objects of its object-oriented operating system.

The present invention therefore provides a network system, comprising at least two network units, of which at least one is provided with an insufficient amount of memory space, wherein the network unit which comprises said insufficient amount of memory space, is able to create a program object through the network to another network unit which comprises a sufficient amount of memory space.

In this network system all class data needed for instantiation of program class objects is kept on the network unit which has a sufficient amount of memory, for example on its file system.

A preferred embodiment of the invention provides a network system wherein instantiation information needed to instantiate a program object class for the first network unit is saved on the memory space of a second network unit.

In another embodiment of the invention a network system is provided wherein instantiation information is saved one or more disks of the second network unit.

In a further preferred embodiment of the invention a network system is provided, wherein instantiation information for instantiating a program object class is kept in corresponding program class object.

In a further preferred embodiment of the invention a network system is provided wherein program class objects are created dynamically.

Further details, features and advantages of the present invention will be elucidated on the basis of the following description of a preferred embodiment thereof en with reference to the annexed drawing.

DETAILED DESCRIPTION OF THE INVENTION

Figure 1:
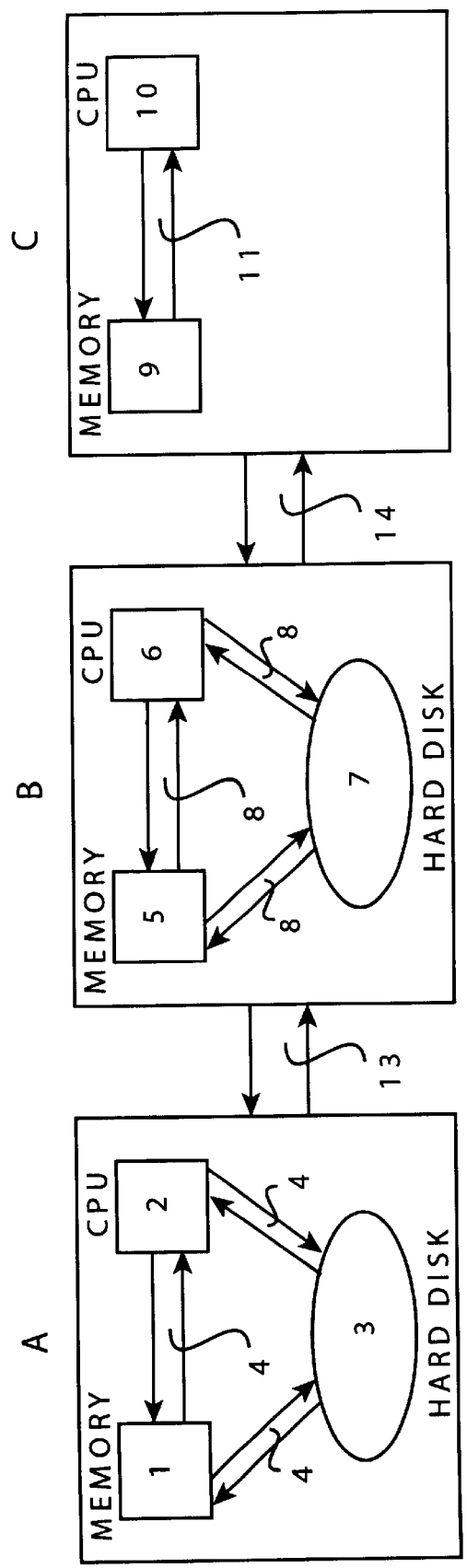
FIG. 1 is a block diagram of an exemplary embodiment of the present invention.

When a program object A needs to create a new program object B, it calls object manager that is responsible for creation of program objects. For this purpose the object manager uses the method NEW ( ). Method NEW instantiates a new program object on a specified execution space with a specified version of a class and returns the object identifier (OID) of the new object. The argument in the message box for method NEW includes the ID (identifier) of the class B for object B, and the version and identity of the execution space the object has to be created on. Preferably class B is itself implemented in a program object, i.e. program class object B. The object manager requests class or program class object B to return its class information specifying the desired version. After a compatibility check the class B will be called by the object manager to get text and data with a specified format. Text, data and information needed for execution of the object are returned. Then resources of memory will be allocated by the address manager. The address manager returns the memory addresses to the object manager which in turn returns the object identifier OID to object Al.

In the above all data needed for instantiation of a class or program class object is kept in memory and the program class objects are created at boot time.

However, according to an embodiment of the present invention, classes of program class objects are created dynamically, i.e. after boot time and only when needed, from disk. The class data needed for the instantiation of the program class object is kept in a file on a remote file system. After the creation of the class, the program class object can be instantiated. In this way the required amount of memory is reduced.

In FIG. 1 a preferred embodiment of the present invention with three hosts A, B, C is shown. Host A is for example a file server comprising of memory (1), hard disk (3), a central processing unit (2) and control lines (4). Host B is for example a personal computer (PC), also comprising at least a hard disk (7), memory (5), central processing unit (6) and control lines (8). Host C is for example a set top box, comprising a memory (9), central processing unit (10) and control lines (11). In this case host C does not dispose of a hard disk. Hosts A and B are interconnected by network (13) while hosts B and C are interconnected by network (14).

Two program class objects called program class object 1 and program class object 2, are stored in a file on the file system or hard disk of host A. These program class objects are to be installed on host B. Next program class object 1 is to be instantiated on host B and program class object 2 is to be instantiated on host C.

The installation of both program class objects on host B is implemented as follows:

installClass (file 1, host B, OID 1)
    installClass (file 2, host B, OID 2)

The parameters file 1 and file 2 identify the files on the file system of host A containing the class instantation data of the respective classes, host B identifies the destination or host the class has to be created on and OID 1 and OID 2 are the resulting returned object identifiers of the newly created program class objects. After the installation there are two program class objects, program class object 1 and program class object 2, running on host B. These program class objects keep reference information needed for their instantiation, in this case an identifier for the files file 1 and file 2 containing the class data. An identifier consists for example of a filename, in this case file 1 and file 2 respectively, and an indication of the location of this file, in this case a directory on the file system of host B.

For creation of a program object on host B the relevant program class object, in this case program class object 1, is instantiated by using the interface NEW.

When a program object of the class or program class object 2 is to be created on host C, which host lacks a harddisk and a sufficient amount of memory, program class object 2 is installed on host C in the manner described above. After installation program class object 2 itself is present on host C, while on host B is saved the class data or instantation data needed for the instantiation of program class object 2. That is, the reference information is kept by the program class object 2 itself, which is present on host C, while the class data or instantation data is either stored in the memory or stored on the disk of host B. The link between the program class object 2 and the stored class data or instantation data is achieved by he reference information contained in the program class object 2.

Next a program object is created by instantation of program class object 2. This is achieved by interface NEW, in which the argument in the message box contains the identifier of the program class object 1 for the program object to be created, the version and identity of the environment the object has to be created on, in this case an environment on host C.

Instead of using the object identifier OID also a specific name can be used which is mapped onto the object identifier OID through a namer object.

What is claimed is:

1. A network system which creates program objects on a network unit having insufficient storage space, comprising:

a first network unit, having a sufficient amount of storage space, in which a first program object is installed; and a second network unit, having an insufficient amount of storage space, for storing program class data and for creating a second program object, which corresponds to said program class data, by providing a link between said program class data and said first program object.

2. The network system according to claim 1, wherein the first program object contains instantiation data.

3. The network system according to claim 2, wherein the program class data contains reference information referring to the instantiation data installed on the first network unit.

4. The network system according to claim 3, wherein the reference information identifies a name and a location of the first program object.

5. The network system according to claim 1, wherein the storage space of the first network unit comprises one or more disks.

6. The network system according to claim 1, wherein the program class data is created dynamically.

* * * * *